(No Model.) 3 Sheets—Sheet 1.
E. WESTON.
ELECTRICAL MEASURING INSTRUMENT.
No. 480,896. Patented Aug. 16, 1892.
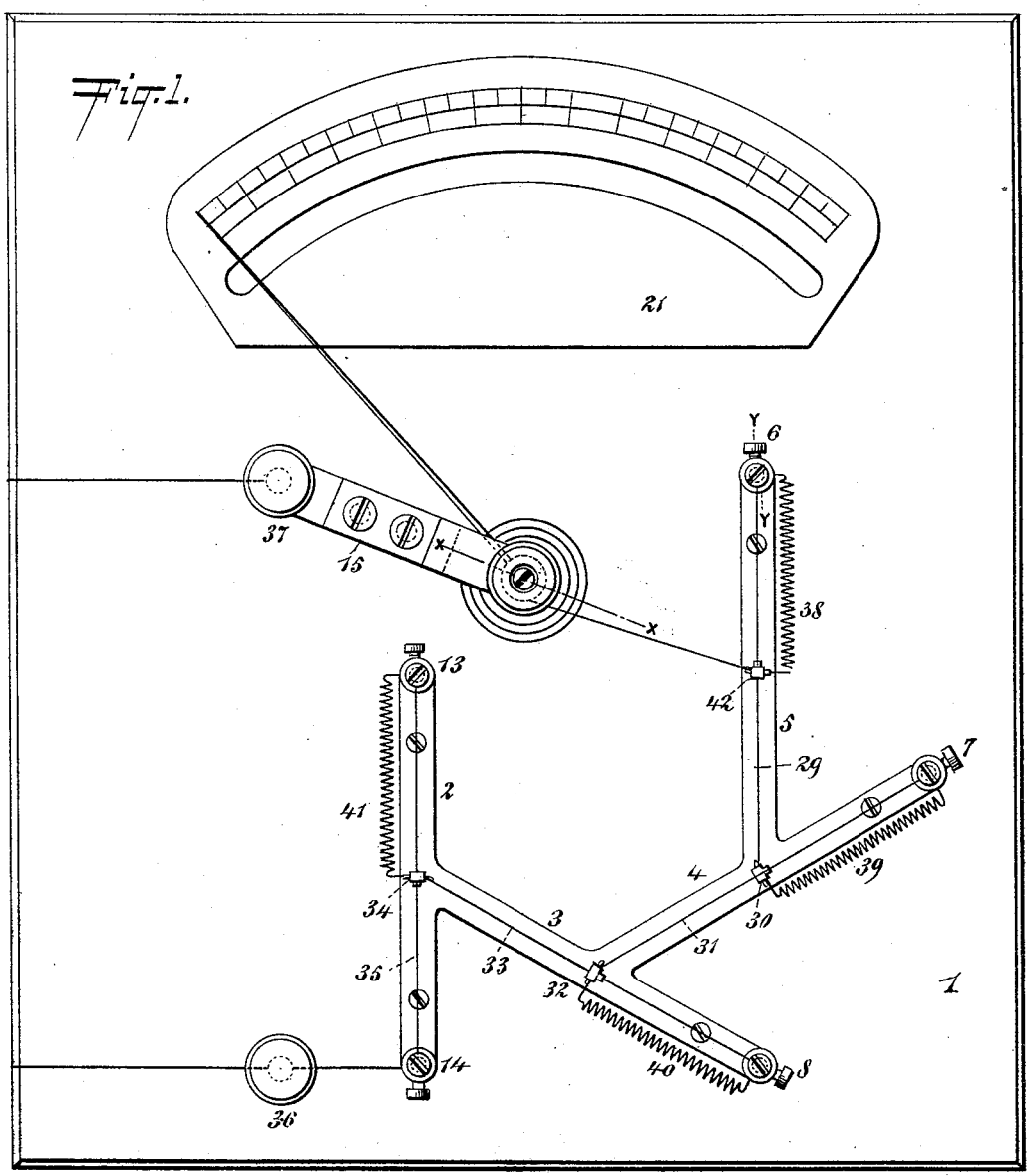
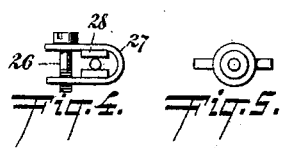
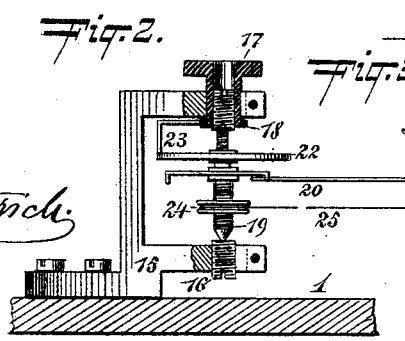
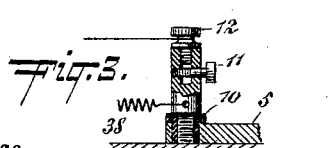
WITNESSES:
Gustav Dieterich
H. R. Moller
INVENTOR
Edward Weston
BY Park Benjamin
his ATTORNEY.

(No Model.)
3 Sheets—Sheet 2.

E. WESTON.
ELECTRICAL MEASURING INSTRUMENT.

No. 480,896. Patented Aug. 16, 1892.

WITNESSES:
H. R. Moller
M. Orosch.

INVENTOR
Edward Weston
BY Park Benjamin
his ATTORNEY.

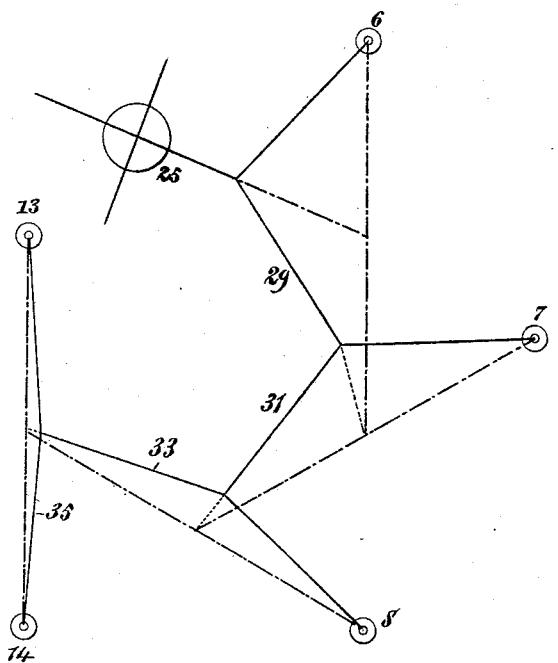

UNITED STATES PATENT OFFICE.

EDWARD WESTON, OF NEWARK, NEW JERSEY.

ELECTRICAL MEASURING-INSTRUMENT.

SPECIFICATION forming part of Letters Patent No. 480,896, dated August 16, 1892.

Application filed January 14, 1892. Serial No. 418,100. (No model.)

*To all whom it may concern:*

Be it known that I, EDWARD WESTON, of Newark, Essex county, New Jersey, have invented a new and useful Improvement in Electrical Measuring-Instruments, of which the following is a specification.

My invention is a new instrument for measuring differences in electrical potential and current strength.

Figure 6:
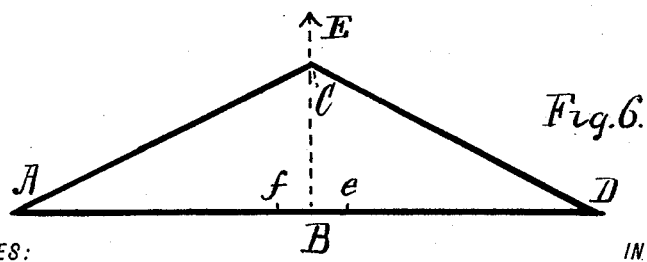

I can best explain the principle of my invention by reference to the simple diagram Figure 6.

Let A D represent a flexible body, such as a cord or wire extended between two fixed points. Assume any force to be applied to said wire at its middle point B, the said force, however, not being sufficient to produce deviation of the wire from a right line. Assume that the wire A D from any cause becomes lengthened or expanded. The force acting at B in the direction B E will then draw said middle point of the wire out of a right line. Let it be assumed that the extent of expansion or elongation of the wire A D be represented by the short line $a\,b$ and that such expansion be uniform throughout the wire. Then the lengths of wire included between the points A B and B D will each have expanded a distance equal to $a\,c$ or one-half of $a\,b$. Produce the line B E, representing the direction of the force acting at the point B. Set off the distance B $e$ and the distance B $f$ from the point B and along the line A D. From the point A as a center, with a radius equal to A $e$, describe a circle which will cut the line B E at C. If another circle be struck from the point D, with a radius equal to D $f$, then that circle will cut the line B $e$ of course at the same point C, and the line A C D will represent the wire A D after the aforesaid elongation or expansion has occurred and after the middle point B of the wire has been displaced a distance B C to said point C. It will at once be apparent that the distance B C is considerably greater than the distance $a\,b$, and that therefore for a comparatively small elongation of the wire A D we have a large displacement of its middle point B. The extent of this displacement can always be determined by the following simple trigonometrical formulæ:

(1) $\cos A = \dfrac{A\,B}{A\,C}$, and (2) $C\,B = A\,C$, sine A.

Applying these formulæ practically let A D, for example, measure eight inches. Assume, merely for illustration, the total elongation of the wire to be .2 of an inch. Then A C will equal 4.1 inches, from which we find that the angle at A equals twelve degrees and forty minutes, the sine of which equals .2192. This, in accordance with Formula 2, being multiplied by 4.1, equals .898 inch, so that for an elongation of the wire A D of .2 of one inch we have a lateral displacement of the middle point B of about .9 of an inch.

Figure 7:
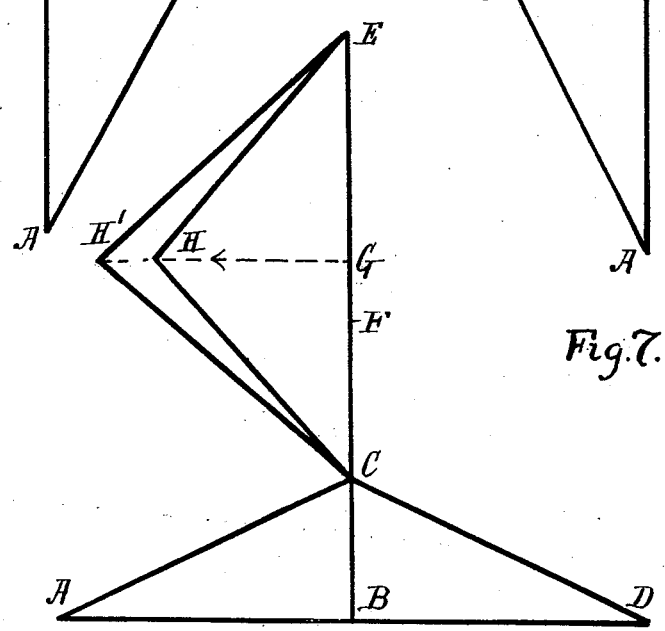

Now suppose, as shown in Fig. 7, that we connect to the point B of the wire A D a second wire B E, equal in length to A D, the abutment E being fixed. It will be clear that when the point B is displaced to the point C the middle point on the wire B E between the abutments will no longer be the point F, but the point G, and therefore the distance C G will not be equal to A B, but to A B $-\frac{1}{2}$ B C, while the distance C H remains equal to the distance A B. Therefore we have $\cos C = \dfrac{A\,B - \frac{1}{2}\,B\,C}{A\,B} = \dfrac{3.55}{4} = .887$, which corresponds to an angle C of twenty-seven degrees and thirty minutes, of which the sine is .461, from which we obtain the distance G H=1.8 inches, so that for an elongation of .2 of an inch of A D we have a displacement of the point G, (to which it is assumed a force is applied, as before,) moving it in the direction G H equal to 1.8 inch; and if we should connect still another wire to G we could obtain a relatively still greater displacement of the middle point of that wire, and so on indefinitely, until by increasing wires connected up in the same way we could get an immensely large displacement of a given point at one end of the series for a relatively small displacement of a given point at the other end of the series. Now, further than this, it has been assumed in the foregoing that while the point B of attachment of the wire B E was displaced to the point C, there has been no actual elongation of the wire. Suppose that the wire B E were also elongated to the same extent as the wire A D. Then the distance H C would have to be made equal to A C or C H'. Substituting this distance in the preceding formulæ, we obtain the following:

$$C\ G = A\ B - \tfrac{1}{2}\ B\ C,\ C\ H' = A\ C.$$

Then $$\text{Cos.}\ C = \frac{3.55}{4.1} = .867.$$

which corresponds to an angle of twenty-nine degrees and fifty minutes, of which the sine is .4974, from which we find that the length G H' is equal to 2.03 inches.

Figure 8:
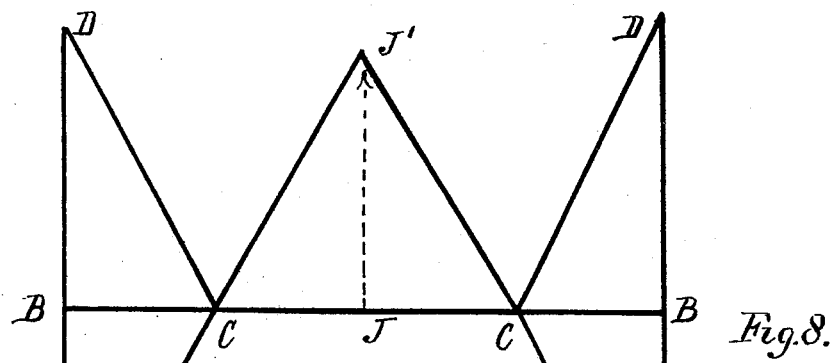

Referring now to Fig. 8, we have still a third case. Here we have two wires A D exactly similar and disposed parallel one to the other. Each is supposed to have, in connection with the same elongation referred to in Fig. 6, a displacement of their middle points to the position C, as before; but between the points B B we have connected a third wire, to the middle point J of which force is applied, as before, in the direction J J'. Considering the triangle C J J', it is obvious that the distance J C=A B−C B, and that the distance J' C=A B, and by working out the formula as before we find that the distance J J' is equal to 2.5 inches.

Other examples illustrative of my principle might be given; but the following, it is thought, will abundantly suffice to make it plain. It may be stated, broadly, in the following terms: first, to cause in a body extended between two points and subjected to a strain applied at an angle to the longitudinal direction of said body an elongation or expansion whereby said strain is enabled to cause a point on said body to move to a new position, the longitudinal extent of which movement is greater than the longitudinal expansion or contraction of said body, and, second, to connect a second flexible body to said point on said first body and to an abutment and to subject said second body to a strain angularly applied, whereby when said point of attachment or movable abutment of said second body is moved toward the fixed abutment the point of application of said strain to said second body shall traverse a distance greater in extent than that traversed by said movable abutment. I may utilize this principle in many ways and apply it to many different forms of apparatus, and it is therefore distinctly to be understood that I do not limit myself in the employment of the said principle to the particular apparatus which is herein illustrated and which forms one operative means for carrying said principle into useful effect to produce a beneficial result. Thus in my present application my said principle is embodied in an electrical measuring apparatus, for which I find it particularly well adapted; but I have also applied it to other measuring-instruments—as, for example, to thermometers—and, generally speaking, it may be applied to any device wherein by any means a body—such as A D in Fig. 6—may be caused by any outside influence to vary in length.

The main object of my invention is to produce for very slight changes in a body acted upon, whether in contraction or expansion or displacement of one or both extremities, a comparatively large movement of an object controlled by said body—as, for example, an indicating-needle—so that in the last-mentioned case for slight changes in the original actuating force I may obtain large movements of an index, whereby said slight changes or even fractions thereof may be accurately recognized.

Referring now to the accompanying drawings, Fig. 1 is a plan view of an instrument adapted to measure differences of electrical potential between its terminals. Fig. 2 is a partial sectional view on the line X X of Fig. 1. Fig. 3 is an elevation and partial sectional view on the line Y Y of Fig. 1. Figs. 4 and 5 are side and top views of the device for connecting the wires together. Figs. 6, 7, and 8 are, as already stated, diagrams illustrative of my principle. Fig. 9 is a diagram illustrative of the mode of operation of the wires in the apparatus of Figs. 1 to 5.

Similar letters and numbers of reference indicate like parts 1 is the base-board of the instrument. Upon said base I fasten a series of elongated metal plates 2 3 4 5. Plate 3 extends from about the middle of plate 2, plate 4, from the middle of plate 3, and plate 5 from the middle of plate 4, as shown. This arrangement is arbitrary and is simply adapted here for convenience. Any other suitable disposition of the plates may be substituted. At the extremities of the plates 3, 4, and 5 are binding-posts 6 7 8, each arranged as shown in Fig. 3. These binding-posts are supported by the plates 3 4 5, but are insulated from them by sleeves of hard rubber or other suitable material, as shown at 10. In each binding-post there is a clamping-screw 11 and on the top the stud 12. Binding-posts 13 and 14, similar to those already described, are located at each end of plate 2.

15, Fig. 2, is a bracket having two arms. In the lower arm is an adjustable screw-step 16. In the upper arm there is a sleeve 17, which receives another adjustable screw-step 18.

19 is a short arbor pivoted in the steps 18 and 16. This arbor carries the index-needle 20, which extends over a scale-plate 21. Also connected to said arbor is one end of a spiral spring 22. The other end of the spring 22 is connected to a bent arm 23, which is fastened to the sleeve 17. By turning the sleeve 17 in one direction or the other the spring can be tightened or loosened, as desired. Also on the arbor 19 is a disk 24, to which is secured one end of a fine metallic wire 25. The other end of this wire is connected to the pin 26 of a shackle 27. Between the arms of the shackle 27 are two pieces of insulating material 28, and between these pieces of insulating material extends another wire 29, similar to wire 25. One end of wire 29 is connected to the stud 12 of the binding-post 6 and the other end to shackle 30, similar in all respects to the shackle shown in Fig. 4, and supported on a wire 31, similar to wire 29. One end of wire 31 is connected to the binding-post 7 and the other to a shackle 32, similar to shackle 30, and the wire 33, which is similar to the wire 31. One end of wire 33 is connected to binding-post 8 and the other end to a shackle 34, similar to shackle 30. The shackle 34 is supported on wire 35, the ends of which are connected to the studs on the binding-posts 13 and 14. The binding-post 14 communicates by wire with the main binding-post 36. The bracket 15 communicates with the main binding-post 37. Because the end of wire 25 is fastened to the disk 24 on the shaft 19, and because this shaft is submitted to torque by the action of the spring 22, it follows that a constant pulling strain is exerted by the wire 25 upon the shackle on the wire 29 and that this strain is then transmitted through the intervening wires to the shackle 34 on the wire 35. This is the constant pulling force referred to in my preceding explanation of the principle of the device. The extent of this force can of course be graduated by turning the sleeve 17, and thereby causing the spring to exert more or less tension; but it should not be sufficient of itself to pull the wires 29 30 33 35, which are normally strained, out of line, although, on the other hand, it should be sufficient to take up any slack and maintain the wires tense when they become elongated or expanded. The wires 25, 29, 31, 33, and 35 should be in practice about one to two one-thousandths of an inch in diameter and should be made of (preferably) platinum or platinum - silver. Extending between the binding-post 6 and the shackle on wire 29 is a coiled wire 38. A similar coiled wire 39 extends between the binding-post 7 and shackle 30, another one 40 between the binding-post 8 and shackle 32, and another 41 between the binding-post 13 and shackle 34.

The circuit in the instrument is as follows: from the binding-post 37 to the bracket 15, to the spindle 19, wire 25, to the shackle on the wire 29, thence to the coiled wire 38, to binding-post 6, wire 29, shackle 30, wire 39, binding-post 7, wire 31, shackle 32, coiled wire 40, binding-post 8, wire 33, shackle 34, coiled wire 41, binding-post 13, wire 35, binding-post 14, and binding-post 36.

The operation of the instrument is as follows, (see diagram Fig. 9:) The current passing over the circuit named produces in every wire 35 33 31 29 a certain definite and known expansion or elongation. The effect upon the wire 35, strained, as it is, between the fixed points 13 and 14 and subjected to the pull of the wire 33, is to cause a displacement of the central point or shackle 34, as shown in Fig. 6, and the conditions illustrated in that figure then occur; but the shackle 34 is a movable point of attachment of the wire 33. Therefore we have the conditions which are represented in Fig. 7, and there will be a still greater displacement of the middle point of the wire 33. These conditions are again repeated with the wire 31 and again with the wire 29, so that finally, as is shown in Fig. 9, a very large displacement of the middle point or shackle 42 of wire 29 occurs. The constant pull on wire 25, as I have already explained, is maintained by the torque of the spring 22, and as the wires yield because of the elongation before noted the wire 25 is wound up by the spring; but the revolution of the shaft also moves the needle 20 over the scale, so that, as will be apparent, for a very small increase in the length of the wire 35, due to its elongation by the heating effect of the current, a very large arc of movement of index-needle 20 results.

It will be noted that the current is conducted through every one of the several wires 35, 33, 31, and 29, and therefore we have both conditions noted in Fig. 7—that is to say, a movement of one abutment of the wire and also an elongation of that wire, due to increased heat. It is not, of course, necessary that the current should pass through all the wires, because, as I have already shown in Fig. 7, a displacement of the first wire 35, due to the passage of the current through it, would become enormously magnified when the wire 29 is reached, even if the passage of the current were restricted to the first-named wire only; but by passing the current through all the wires I get, first, a greater range of movement of the index, and, second, a greater sensitiveness of the apparatus.

It will be plain from this construction that I am not obliged to heat my wires to high temperatures in order to get a sufficient range of index movement. This is one of the great difficulties incident to all classes of measuring-instruments which depend upon the expansion of wires heated by the current. The constant heating and cooling of the wire not only soon destroy it, but produce permanent set, which in time renders the instrument inaccurate.

I find that in practice I need not use a temperature exceeding 100° centigrade, and it is obvious that the strength of the current need be but very small.

In order to neutralize the effects of atmospheric temperature upon the wire, it is proposed to make the plates 2 3 4, &c., of some metal or combination of metals having a ratio of expansion similar to that of the wire, so that if the wire expands the plate will also expand, thus separating the binding-posts 13 and 14 still farther apart, and so maintaining the normal conditions of the wire.

By the term "flexible body of conducting material" as herein used I mean a body of any substance or material which when effected by electricity will change in dimension, so as to allow of a displacement of the point thereon to which strain is normally applied.

By the term "abutment" as herein used I mean the point to which an end of the aforesaid body is fastened, whether said point be movable or fixed.

By the term "indicating device" I mean any contrivance which is actuated, governed, or controlled by or through the displacement of the said point on the said flexible body to show the result of said displacement. Such device may, therefore, be not merely a pointer mechanically moved, but may be a simple scale, for example, inscribed on the base-plate or elsewhere in the vicinity of the point on the wire that is displaced.

By the statement "subjected to the action of electricity" I mean, and I intend to include in my claims, any way whatever of electrically affecting the said flexible body, whether by the direct passage of a current through it or by the induction of a neighboring current, or by any other electrical means whereby it may be subjected to such modification or alteration in dimension as will allow the strain upon it to cause a displacement of the point of application of said strain.

By the words "a means of applying strain to said body" I mean any way of applying force physically to said flexible body, whether it be of the embodiment here shown—namely, another connected wire or cord—or whether it be a non-mechanical pull—such, for example, as will be exerted by a magnet upon its armature.

By the words "a means of electrically moving one or both of said abutments" I mean not only the specific means here shown, which consists in the elongation or expansion of the wire due to the passage of a current through it, but any other electrical means or apparatus for producing a like result, such as the push or pull of an electrode upon the abutment, as an armature. It is also to be understood that I intend to include, and desire that my hereinafter claims may be so construed as to include, the reverse operation of my apparatus, by which I mean the actuation of the indicating mechanism by the contraction of the wires due to a cessation or diminution of the current or of the electric effect upon them.

I claim—

1. A flexible body of conducting material extending between abutments, a second flexible body connected to a point on said first body and to an abutment and disposed at an angle to said first body, a means of applying strain at an angle to said second body to a point thereon between its abutment and its place of connection to said first body, and an indicating device showing the displacement of said point on said second body due to said strain when said first body is subjected to the action of electricity.

2. A flexible body of conducting material extending between abutments, a second flexible body of conducting material connected to a point on said first body and to an abutment and disposed at an angle to said first body, a means of applying strain at an angle to said second body to a point thereon between its abutment and its place of connection to said first body, and an indicating device showing the displacement of said point on said second body due to said strain when both of said bodies are subjected to the action of electricity.

3. A flexible body of conducting material extending between abutments, a second flexible body of conducting material connected to a point on said first body and to an abutment and disposed at an angle to said first body, the said bodies being in electrical circuit, a means of applying strain at an angle to said second body to a point thereon between its abutment and its place of connection to said first body, and an indicating device showing the displacement of said point on said second body due to said strain when said bodies are traversed by an electric current.

4. A flexible body of conducting material extending between abutments, a means of applying strain at an angle to said body to a point thereon between said abutments, a means of electrically moving one of said abutments, and an indicating device showing the displacement of said point due to said strain when the distance between said abutments is varied.

5. The combination, in an electrical measuring-instrument, of a wire filament or strip, as 35, extended between abutments, a support upon said wire and insulated therefrom, an extensible conductor 41, extended from one end of said filament to said support, and a circuit-conductor connected to said extensible conductor 41.

EDWARD WESTON.

Witnesses:
R. C. FESSENDEN,
H. R. MOLLER.